US012666499B2

(12) United States Patent　　　(10) Patent No.:　US 12,666,499 B2
Li et al.　　　　　　　　　　　　(45) Date of Patent:　　Jun. 23, 2026

(54) COMMUNICATION CONFIGURATION METHOD AND COMMUNICATION APPARATUS

(71) Applicant: HUAWEI TECHNOLOGIES CO., LTD., Shenzhen (CN)

(72) Inventors: Xiangyu Li, Shanghai (CN); Qiang Fan, Shanghai (CN); Jun Wang, Shanghai (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 18/317,914

(22) Filed: May 15, 2023

(65) Prior Publication Data

US 2023/0284334 A1　　Sep. 7, 2023

Related U.S. Application Data

(63) Continuation of application No. PCT/CN2020/132835, filed on Nov. 30, 2020.

(51) Int. Cl.
*H04W 76/34*　　　(2018.01)

(52) U.S. Cl.
CPC .................................. *H04W 76/34* (2018.02)

(58) Field of Classification Search
None
See application file for complete search history.

(56) References Cited

U.S. PATENT DOCUMENTS

| | | | |
|---|---|---|---|
| 2019/0274121 A1 | 9/2019 | Wu et al. | |
| 2019/0349722 A1 | 11/2019 | Lee et al. | |
| 2021/0051653 A1* | 2/2021 | Park | H04W 72/21 |
| 2023/0180313 A1* | 6/2023 | Freda | H04W 76/14 370/310 |
| 2023/0189050 A1* | 6/2023 | Rao | H04W 28/0236 370/231 |
| 2023/0345558 A1* | 10/2023 | Zhao | H04W 76/14 |

FOREIGN PATENT DOCUMENTS

CN　　　110461020 A　　11/2019

OTHER PUBLICATIONS

InterDigital Inc., Discussion and TP on UE to UE Relay Based on L2 Relay Architecture. 3GPP RAN WG2 Meeting #111-e, Electronic, Aug. 17-Aug. 28, 2020, R2-2006760, 6 pages.
Intel Corporation, Characteristics of L2 and L3-based Sidelink Relaying. 3GPP TSG-RAN WG2 Meeting#111e, E-meeting, Aug. 17-28, 2020, R2-2006718, 23 pages.

(Continued)

*Primary Examiner* — Jenkey Van

(57)　　　　ABSTRACT

In a communication configuration method, a first terminal device determines a first message that comprises first information and second information. The first information comprises radio link control (RLC) bearer configuration information of a first sidelink, and the second information comprises RLC bearer configuration information of a second sidelink. The first sidelink is between the first terminal device and a third terminal device, and the second sidelink is between the third terminal device and a second terminal device. The first terminal device then sends the first message to the third terminal device.

6 Claims, 7 Drawing Sheets

(56) References Cited

OTHER PUBLICATIONS

Intel Corporation, Impact on user plane protocol stack and control plane procedure for Sidelink relay. 3GPP TSG-RAN WG2 Meeting#111e, E-meeting, Aug. 17-28, 2020, R2-2007608, 10 pages.
3GPP TR 23.752 V0.7.0 (Nov. 2020), 3rd Generation Partnership Project; Technical Specification Group Services and System Aspects; Study on system enhancement for Proximity based Services (ProSe) in the 5G System (5GS) (Release 17), 181 pages.

* cited by examiner

COMMUNICATION CONFIGURATION METHOD AND COMMUNICATION APPARATUS

CROSS-REFERENCE TO RELATED APPLICATIONS

This application is a continuation of International Application PCT/CN2020/132835, filed on Nov. 30, 2020, the disclosure of which is hereby incorporated by reference in its entirety.

TECHNICAL FIELD

This application relates to the communication field, and specifically, to a communication configuration method and a communication apparatus.

BACKGROUND

In L2 (Layer/Layer 2) user equipment (UE) to UE (U2U) relay communication, data sent by relay UE to receiving UE is not from an upper layer of the relay UE, but from sending UE. Therefore, when the relay UE is in a radio resource control (RRC) connected state, quality of service (QoS) information indicated by the upper layer cannot be met, and a condition for reporting a SidelinkUEInformation (SUI) message to obtain a sidelink radio bearer (SLRB) configuration is triggered. Further, because QoS requirements of data packets sent on a sidelink between the sending UE and the relay UE and a sidelink between the relay UE and the receiving UE are closely related, if the sending UE and the relay UE separately obtain radio link control (RLC) bearer configurations of the two sidelinks, the QoS requirement from the relay UE to the receiving UE may not be ensured.

SUMMARY

This application provides a communication configuration method, to ensure an end-to-end QoS requirement of communication between sending UE and receiving UE through relay UE, and improve U2U relay communication quality.

According to a first aspect, a communication configuration method is provided. The method may be applied to a first terminal device, and may be applied to a component (such as a chip, a chip system, or a processor) in the first terminal device. The method includes: determining a first message, where the first message includes first information and second information, the first information includes radio link control RLC bearer configuration information of a first sidelink, the second information includes RLC bearer configuration information of a second sidelink, the first sidelink is a sidelink between the first terminal device and the third terminal device, and the second sidelink is a sidelink between the third terminal device and a second terminal device; and sending, by the first terminal device, the first message to the third terminal device.

In the foregoing technical solution, the sending UE determines the RLC bearer configuration information of the two sidelinks between the sending UE and the relay UE and between the relay UE and the receiving UE, so that the end-to-end QoS requirement of communication between sending UE and the receiving UE through the relay UE can be ensured, to improve U2U relay communication quality.

With reference to the first aspect, in some implementations of the first aspect, the first terminal device and the second terminal device communicate with each other through the third terminal device.

With reference to the first aspect, in some implementations of the first aspect, the first message further includes first quality of service QoS information, and the first QoS information is QoS information corresponding to the second information.

With reference to the first aspect, in some implementations of the first aspect, the determining a first message includes: receiving a second message sent by a first network device, where the second message includes first information and second information, or the second message includes the first information; and determining, by the first terminal device, the first message based on the second message.

With reference to the first aspect, in some implementations of the first aspect, before the receiving a second message sent by a first network device, the method further includes: sending second QoS information to the first network device, where the second QoS information is QoS information between the first terminal device and the second terminal device, and the second message is determined by the first network device based on the second QoS information.

Optionally, when the first terminal device is in an RRC connected state, in a manner 1, the first terminal device reports the end-to-end QoS information (namely, the second QoS information) corresponding to the second terminal device, and then a base station (namely, the first network device) of the first terminal device sends, to the first terminal device, RLC bearer configuration information of a first unicast connection and RLC bearer configuration information of a second unicast connection. Optionally, the base station of the first terminal device may further determine QoS information associated with the RLC bearer configuration information of the second unicast connection, and send the QoS information to the first terminal device. In a manner 2, the first terminal device reports the end-to-end QoS information corresponding to the second terminal device. The base station of the first terminal device sends only the RLC bearer configuration information of the first unicast connection to the first terminal device. The first terminal device determines the RLC bearer configuration information of the second unicast connection based on the RLC bearer configuration information of the first unicast connection and the end-to-end QoS information between the first terminal device and the second terminal device. Optionally, the first terminal device may further determine, based on the RLC bearer configuration information of the first unicast connection and/or end-to-end QoS information corresponding to the RLC bearer configuration information, QoS information associated with the RLC bearer configuration information of the second unicast connection.

With reference to the first aspect, in some implementations of the first aspect, the determining a first message includes: obtaining the first information from a third message, where the third message includes a system information block SIB system broadcast message and/or preconfigured information; and determining, by the first terminal device, second information based on the first information.

Optionally, when the first terminal device is in a non-RRC connected state, for example, the first terminal device is in an RRC idle state, an RRC inactive state, or an OOC state, the first terminal device determines the RLC bearer configuration information of the second unicast connection based on the RLC bearer configuration information of the first unicast connection obtained from the SIB system broadcast message and/or the preconfigured information (namely, an example of the third message) and the end-to-end QoS information that is between the first terminal device and the second terminal device and that is corresponding to the RLC bearer configuration information.

With reference to the first aspect, in some implementations of the first aspect, the method further includes: receiving a first response message sent by the third terminal device, where the first response message indicates that a part or all of the first information and the second information is successfully configured or fails to be configured.

With reference to the first aspect, in some implementations of the first aspect, that a part of the first information and the second information is successfully configured includes: RLC bearer configuration information that is of a sidelink related to the third terminal device and that is in the first information and the second information is successfully configured.

With reference to the first aspect, in some implementations of the first aspect, when the first response message indicates that the first information and the second information fail to be configured, the first response message further specifically indicates that a part or all of RLC bearer configuration information that is of a sidelink related to the second terminal device and/or the third terminal device and that is in the first information and the second information fails to be configured.

According to a second aspect, a communication configuration method is provided. The method may be applied to a third terminal device, and may be applied to a component (such as a chip, a chip system, or a processor) in the third terminal device. The method includes: receiving a first message sent by a first terminal device, where the first message includes first information and second information, the first information includes radio link control RLC bearer configuration information of a first sidelink, the second information includes RLC bearer configuration information of a second sidelink, the first sidelink is a sidelink between the first terminal device and the third terminal device, and the second sidelink is a sidelink between the third terminal device and a second terminal device; and sending a fourth message to the second terminal device, where the fourth message includes third information, and the third information is all or a part of the second information.

In the foregoing technical solution, the relay UE receives the RLC bearer configuration information that is of the two sidelinks and that is sent by the sending UE, and forwards a part or all of the RLC bearer configuration information of the sidelink between the relay UE and the receiving UE to the receiving UE. In this way, the end-to-end QoS requirement of communication between the sending UE and the receiving UE through the relay UE can be ensured, to improve U2U relay communication quality.

With reference to the second aspect, in some implementations of the second aspect, the first terminal device and the second terminal device communicate with each other through the third terminal device.

With reference to the second aspect, in some implementations of the second aspect, the first message further includes first quality of service QoS information, and the first QoS information is QoS information corresponding to the second information, and the method further includes: sending the first QoS information to the second terminal device.

With reference to the second aspect, in some implementations of the second aspect, the method further includes: sending a first response message to the first terminal device, where the first response message indicates that a part or all of the first information and the second information is successfully configured or fails to be configured.

With reference to the second aspect, in some implementations of the second aspect, that a part of the first information and the second information is successfully configured includes: RLC bearer configuration information that is of a sidelink related to the third terminal device and that is in the first information and the second information is successfully configured.

With reference to the second aspect, in some implementations of the second aspect, when the first response message indicates that the first information and the second information fail to be configured, the first response message further specifically indicates that a part or all of RLC bearer configuration information that is of a sidelink related to the second terminal device and/or the third terminal device and that is in the first information and the second information fails to be configured.

With reference to the second aspect, in some implementations of the second aspect, the method further includes: receiving a second response message sent by the second terminal device, where the second response message indicates that the third information is successfully configured or fails to be configured.

According to a third aspect, a bearer releasing method is provided. The method may be applied to a first terminal device, and may be applied to a component (such as a chip, a chip system, or a processor) in the first terminal device. The method includes: determining a first message, where the first message includes first information and/or second information, the first information includes radio link control RLC bearer release information of a first sidelink, the second information includes RLC bearer release information of a second sidelink, the first sidelink is a sidelink between the first terminal device and a third terminal device, and the second sidelink is a sidelink between the third terminal device and a second terminal device; and sending, by the first terminal device, the first message to the third terminal device.

With reference to the third aspect, in some implementations of the third aspect, the first terminal device and the second terminal device communicate with each other through the third terminal device.

With reference to the third aspect, in some implementations of the third aspect, the method further includes: receiving a first response message sent by the third terminal device, where the first response message indicates that a part or all of an RLC bearer of the first sidelink and a radio link control RLC bearer of the second sidelink are successfully released or fail to be released.

With reference to the third aspect, in some implementations of the third aspect, that a part of the RLC bearer of the first sidelink and the RLC bearer of the second sidelink are successfully released includes: an RLC bearer that is of a sidelink related to the third terminal device and that is in the RLC bearer of the first sidelink and the RLC bearer of the second sidelink is successfully released.

With reference to the third aspect, in some implementations of the third aspect, when the first response message indicates that the RLC bearer of the first sidelink and the RLC bearer of the second sidelink fail to be released, the first response message further specifically indicates that a part or all of RLC bearers that are of a sidelink related to the second terminal device and/or the third terminal device and that are in the first information and the second information fail to be released.

According to a fourth aspect, a bearer releasing method is provided. The method may be applied to a third terminal device, and may be applied to a component (such as a chip, a chip system, or a processor) in the third terminal device. The method includes: receiving a first message sent by a first terminal device, where the first message includes first information and/or second information, the first information includes radio link control RLC bearer release information of a first sidelink, the second information includes RLC bearer release information of a second sidelink, the first sidelink is a sidelink between the first terminal device and a third terminal device, and the second sidelink is a sidelink between the third terminal device and a second terminal device; determining, by the third terminal device, a second message based on the first message, where the second message includes the second information; and sending the second message to the second terminal device.

With reference to the fourth aspect, in some implementations of the fourth aspect, the first terminal device and the second terminal device communicate with each other through the third terminal device.

With reference to the fourth aspect, in some implementations of the fourth aspect, the method further includes: sending a first response message to the first terminal device, where the first response message indicates that a part or all of an RLC bearer of the first sidelink and an RLC bearer of the second sidelink are successfully released or fail to be released.

With reference to the fourth aspect, in some implementations of the fourth aspect, that a part of the RLC bearer of the first sidelink and the RLC bearer of the second sidelink are successfully released includes: an RLC bearer that is of a sidelink related to the third terminal device and that is in the RLC bearer of the first sidelink and the RLC bearer of the second sidelink is successfully released.

With reference to the fourth aspect, in some implementations of the fourth aspect, when the first response message indicates that the RLC bearer of the first sidelink and the RLC bearer of the second sidelink fail to be released, the first response message further specifically indicates that a part or all of RLC bearers that are of a sidelink related to the second terminal device and/or the third terminal device and that are in the first information and the second information fail to be released.

With reference to the fourth aspect, in some implementations of the fourth aspect, the method further includes: receiving a second response message sent by the second terminal device, where the second response message indicates that the RLC bearer of the second sidelink is successfully released or fails to be configured.

According to a fifth aspect, this application provides a communication apparatus. The communication apparatus has a function of implementing the method in any one of the first aspect or the possible implementations of the first aspect, or a function of implementing the method in any one of the third aspect or the possible implementations of the third aspect. The function may be implemented by hardware, or may be implemented by hardware executing corresponding software. The hardware or the software includes one or more units corresponding to the foregoing functions.

In an example, the communication apparatus may be a first terminal device.

In another example, the communication apparatus may be a component (for example, a chip or an integrated circuit) installed in a first terminal device.

According to a sixth aspect, this application provides a communication apparatus. The communication apparatus has a function of implementing the method in any one of the second aspect or the possible implementations of the second aspect, or a function of implementing the method in any one of the fourth aspect or the possible implementations of the fourth aspect. The function may be implemented by hardware, or may be implemented by hardware executing corresponding software. The hardware or the software includes one or more units corresponding to the foregoing functions.

In an example, the communication apparatus may be a third terminal device.

In another example, the communication apparatus may be a component (for example, a chip or an integrated circuit) installed in a third terminal device.

According to a seventh aspect, this application provides a communication device, including at least one processor. The at least one processor is coupled to at least one memory, the at least one memory is configured to store a computer program or instructions, and the at least one processor is configured to invoke the computer program or the instructions from the at least one memory and run the computer program or the instructions, so that the communication device performs the method in any one of the first aspect or the possible implementations of the first aspect, or the method in any one of the third aspect or the possible implementations of the third aspect.

In an example, the communication device may be a first terminal device.

In another example, the communication device may be a component (for example, a chip or an integrated circuit) installed in a first terminal device.

According to an eighth aspect, this application provides a communication device, including at least one processor. The at least one processor is coupled to at least one memory, the at least one memory is configured to store a computer program or instructions, and the at least one processor is configured to invoke the computer program or the instructions from the at least one memory and run the computer program or the instructions, so that the communication device performs the method in any one of the second aspect or the possible implementations of the second aspect, or the method in any one of the fourth aspect or the possible implementations of the fourth aspect.

In an example, the communication device may be a third terminal device.

In another example, the communication device may be a component (for example, a chip or an integrated circuit) installed in a third terminal device.

According to a ninth aspect, a processor is provided, including an input circuit, an output circuit, and a processing circuit. The processing circuit is configured to: receive a signal by using the input circuit, and transmit a signal by using the output circuit, so that the method in any one of the first aspect or the possible implementations of the first aspect is implemented, or the method in any one of the third aspect or the possible implementations of the third aspect is implemented.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be, for example, but not limited to, received and input by a receiver, and a signal output by the output circuit may be, for example, but not limited to, output to a transmitter and transmitted by the transmitter. The input circuit and the output circuit may be a same circuit, and the circuit is used as the input circuit and the output circuit at different moments. Specific implementations of the processor and the various circuits are not limited in this embodiment of this application.

According to a tenth aspect, a processor is provided, including an input circuit, an output circuit, and a processing circuit. The processing circuit is configured to: receive a signal by using the input circuit, and transmit a signal by using the output circuit, so that the method in any one of the second aspect or the possible implementations of the second aspect is implemented, or the method in any one of the fourth aspect or the possible implementations of the fourth aspect is implemented.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be, for example, but not limited to, received and input by a receiver, and a signal output by the output circuit may be, for example, but not limited to, output to a transmitter and transmitted by the transmitter. The input circuit and the output circuit may be a same circuit, and the circuit is used as the input circuit and the output circuit at different moments. Specific implementations of the processor and the various circuits are not limited in this embodiment of this application.

According to an eleventh aspect, this application provides a computer-readable storage medium. The computer-readable storage medium stores computer instructions, and when the computer instructions are run on a computer, the method in any one of the first aspect or the possible implementations of the first aspect is performed, or the method in any one of the third aspect or the possible implementations of the third aspect is performed.

According to a twelfth aspect, this application provides a computer-readable storage medium. The computer-readable storage medium stores computer instructions, and when the computer instructions are run on a computer, the method in any one of the second aspect or the possible implementations of the second aspect is performed, or the method in any one of the fourth aspect or the possible implementations of the fourth aspect is performed.

According to a thirteenth aspect, this application provides a computer program product. The computer program product includes computer program code, and when the computer program code is run on a computer, the method in any one of the first aspect or the possible implementations of the first aspect is performed, or the method in any one of the third aspect or the possible implementations of the third aspect is performed.

According to a fourteenth aspect, this application provides a computer program product. The computer program product includes computer program code, and when the computer program code is run on a computer, the method in any one of the second aspect or the possible implementations of the second aspect is performed, or the method in any one of the fourth aspect or the possible implementations of the fourth aspect is performed.

According to a fifteenth aspect, this application provides a chip, including a processor and a communication interface. The communication interface is configured to receive a signal and transmit the signal to the processor. The processor processes the signal, so that the method in any one of the first aspect or the possible implementations of the first aspect is performed, or the method in any one of the third aspect or the possible implementations of the third aspect is performed.

According to a sixteenth aspect, this application provides a chip, including a processor and a communication interface. The communication interface is configured to receive a signal and transmit the signal to the processor. The processor processes the signal, so that the method in any one of the second aspect or the possible implementations of the second aspect is performed, or the method in any one of the fourth aspect or the possible implementations of the fourth aspect is performed.

According to a seventeenth aspect, this application provides a communication system, including the communication device according to the seventh aspect and the communication device according to the eighth aspect.

DESCRIPTION OF EMBODIMENTS

The following describes technical solutions of this application with reference to accompanying drawings.

The technical solutions of embodiments of this application may be applied to various communication systems, such as: a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, another future evolved communication system, a vehicle-to-everything (V2X) system, a long term evolution-vehicle (LTE-V) system, an internet of vehicles system, a machine type communication (MTC) system, an internet of things (IoT) system, a long term evolution-machine (LTE-M) system, a machine to machine (M2M) system, where V2X may include vehicle to network (V2N), vehicle to vehicle (V2V), vehicle to infrastructure (V2I), vehicle to pedestrian (V2P), and the like.

Figures 1, 2:
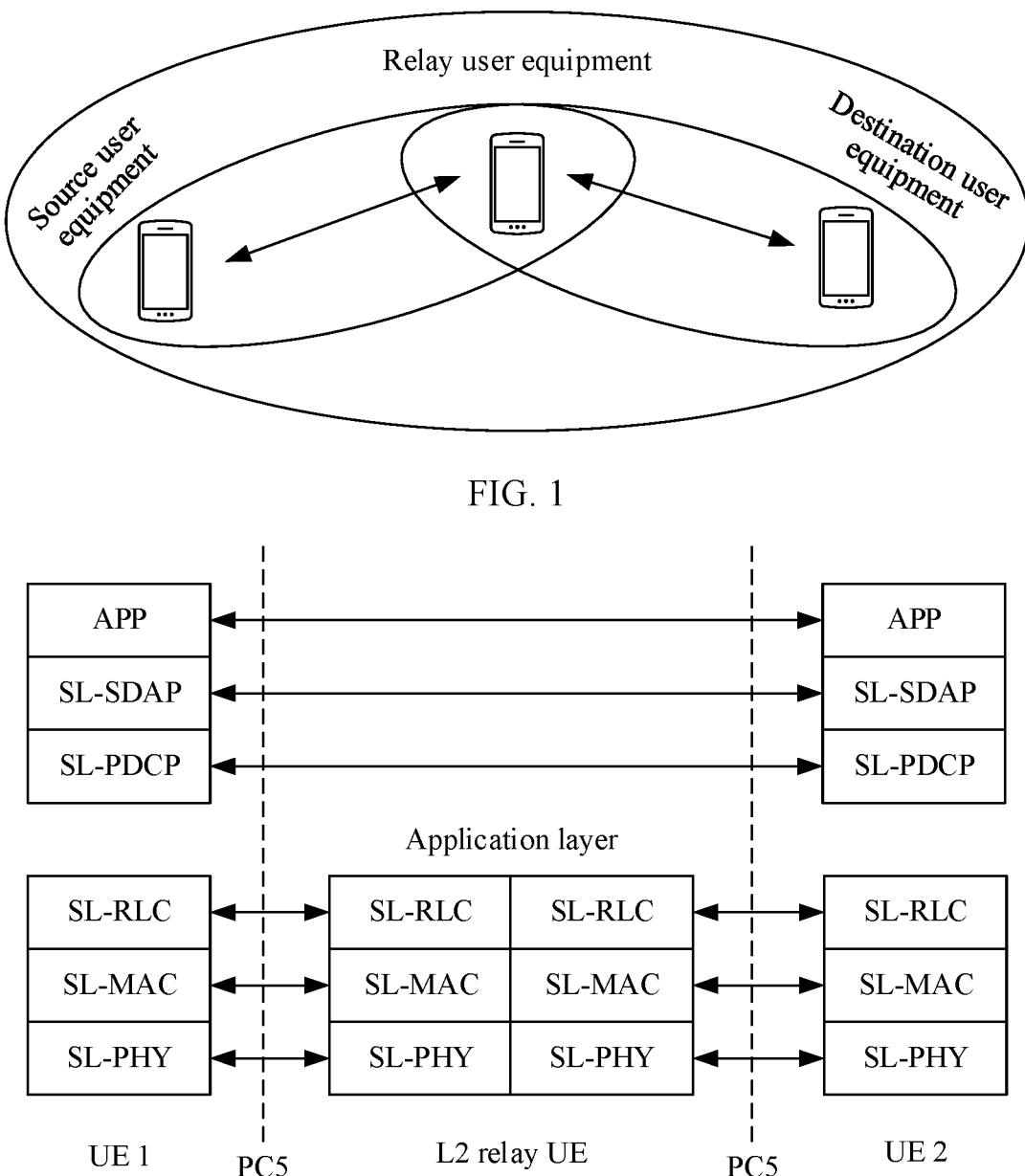
FIG. 1 is a schematic diagram of a UE-to-UE relay scenario according to this application.
FIG. 2 is a schematic diagram of a user plane protocol stack of L2-based UE-to-UE relay.

FIG. 1 is a schematic diagram of a UE-to-UE relay scenario according to this application. As shown in FIG. 1, the network architecture includes at least three terminal devices. It should be understood that, the terminal device in embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like. The network architecture includes at least one source user equipment (source UE), one relay user equipment (relay UE), and one destination user equipment (destination UE). The source UE may also be referred to as sending UE, and the destination UE may also be referred to as receiving UE. This is not specifically limited in this application. During UE to UE (U2U) relay communication, the source UE communicates with the destination UE through one or more relay UEs, and the source UE and the destination UE may transmit data and signaling through the relay UE. This scenario may be used to improve sidelink (SL) coverage enhancement (for example, when a coverage signal between source UE and destination UE is poor or the source UE and the destination UE are located outside coverage) or improve capacity (for example, when the relay UE is a device with a strong capability). The source UE, the relay UE, and the destination UE may be in a radio resource control (RRC) connected state, an RRC idle state, an RRC inactive state, or an out-of-coverage (OOC) state. SL unicast communication is performed between the source UE and the relay UE, and between the relay UE and the destination UE. In a unicast communication mode, two UEs need to first establish a unicast connection. After the unicast connection is established, sending UE (Tx UE) may send unicast data to receiving UE (Rx UE), and only the Rx UE may receive and parse the data. FIG. 1 is merely a simplified schematic diagram of an example. The relay scenario may further include another network device that is not shown in FIG. 1.

The terminal device may be a device, for example, a handheld device or a vehicle-mounted device having a wireless connection function, that provides a user with voice/data connectivity. Currently, some examples of the terminal device are as follows: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), and/or any other suitable device for communication in a wireless communication system. This is not limited in embodiments of this application.

The wearable device may also be referred to as a wearable intelligent device, and is a general term of wearable devices that are intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the terminal device may alternatively be a terminal in an internet of things system. IoT is an important component in development of future information technologies. A main technical feature of the IoT is to connect an object to a network by using a communication technology, to implement an intelligent network of human-machine interconnection and thing-thing interconnection.

In addition, in embodiments of this application, the terminal device may alternatively include a sensor such as an intelligent printer, a train detector, or a gas station. Main functions of the terminal side device include collecting data (a part of terminal devices), receiving control information and downlink data that are of a network device, sending an electromagnetic wave, and transmitting uplink data to the network device.

A network device in embodiments of this application may be a device configured to communicate with the terminal device. The network device may be a base station (base transceiver station, BTS) in a global system for mobile communications (GSM) or a code division multiple access (CDMA) system, may be a NodeB (NB) in a wideband code division multiple access (WCDMA) system, may be an evolved NodeB (eNB, or eNodeB) in an LTE system, may be a radio controller in a cloud radio access network (CRAN) scenario, or may be a radio network controller (RNC), a base station controller (BSC), a home base station (for example, a home evolved NodeB, or a home NodeB, HNB), or a baseband unit (BBU). Alternatively, the network device may be a relay station, an access point, a vehicle-mounted device, a wearable device, a network device in a 5G network, a network device in a future evolved PLMN network, or the like, may be an access point (AP) in WLAN, a radio relay node, a wireless backhaul node, a transmission point (TP), a transmission reception point (TRP), or the like, may be a gNB or a transmission point (TRP or TP) in a new radio (NR) system, or one or a group of antenna panels (including a plurality of antenna panels) of a base station in a 5G system, or may be a network node that constitutes a gNB or a transmission point, for example, a baseband unit (BBU) or a distributed unit (DU). This is not limited in embodiments of this application.

Currently, implementations of UE-to-UE relay discussed in the standard include two manners: an L3 (Layer 3/Layer 3)-based relay manner and an L2 (Layer 2/Layer 2)-based relay manner. In the L3-based relay manner, user plane data is relayed and forwarded at an IP layer. To be specific, the relay UE needs to parse a data packet sent by the source UE to the destination UE to the IP layer, and determines, based on information such as an IP address, to forward the data packet to the destination UE.

FIG. 2 is a schematic diagram of a user plane protocol stack of L2-based UE-to-UE relay. In the L2-based relay manner, user plane data is relayed and forwarded below a packet data convergence protocol (PDCP) layer. The relay UE maintains a relay radio link control (RLC) bearer (bearer), and relays and forwards SL data transmission between UE 1 (sending UE) and UE 2 (receiving UE).

Figure 3:
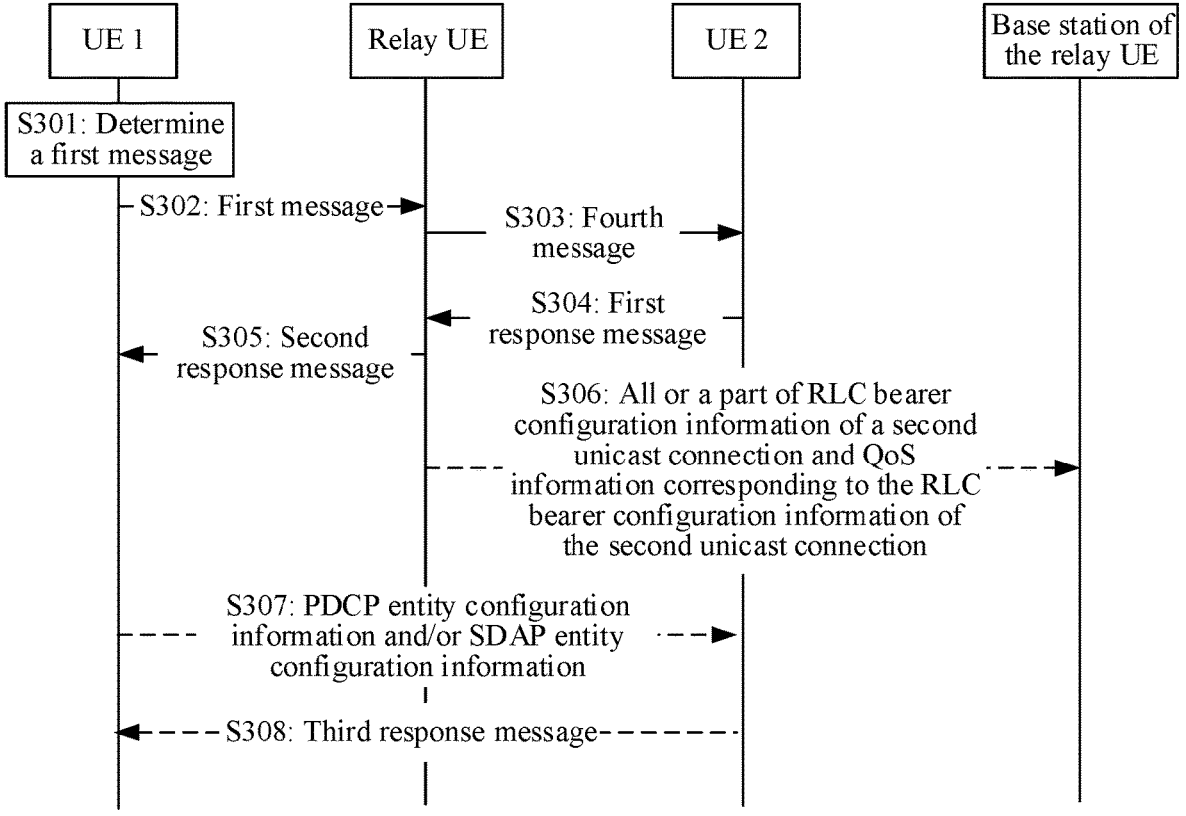
FIG. 3 is a schematic flowchart of a communication configuration method according to this application.

FIG. 3 is a schematic flowchart of a communication configuration method according to this application.

S301: UE 1 (namely, an example of a first terminal device) determines a first message.

The first message includes first information and second information, the first information includes RLC bearer configuration information of a first sidelink, the second information includes RLC bearer configuration information of a second sidelink, the first sidelink is a sidelink between the first terminal device and a third terminal device, and the second sidelink is a sidelink between the third terminal device and a second terminal device.

It may be understood that the sidelink may be a sidelink of a unicast connection, may be a sidelink of a multicast connection, or may be a sidelink of a broadcast connection.

By way of example but not limitation, an example in which the first sidelink and the second sidelink are sidelinks of unicast connections is used below for description. To be specific, an example in which the RLC bearer configuration information of the first sidelink is RLC bearer configuration information of a first unicast connection, and the RLC bearer configuration information of the second sidelink is RLC bearer configuration information of a second unicast connection is used for description. Optionally, the unicast connection may be a PC5-S connection or a PC5-RRC connection.

Optionally, the UE 1 may further determine QoS information (namely, an example of first QoS information) corresponding to an RLC bearer configuration of the second unicast connection. Optionally, the QoS information may be carried in the first message, or may be sent by using another message. This is not specifically limited in this application. The QoS information may include one or more of parameters such as a PC5 interface 5G quality of service identifier PQI (PC5 5G QoS identifier, PC5 5QI), a guaranteed flow bit rate (GFBR), a maximum flow bit rate (MFBR), and a PC5 interface quality of service flow identifier (PC5 QoS flow identifier, PFI).

Optionally, when the UE 1 is in different states, the determining the first message may specifically include the following content.

1. The UE 1 is in an RRC Connected State.

Manner 1: The UE 1 reports end-to-end QoS information corresponding to UE 2 (namely, an example of the second terminal device) (where optionally, the UE 1 may further report U2U relay indication information and/or U2U relay hop count information). Then, a base station of the UE 1 sends a second message to the UE 1. The second message includes the first information and the second information. In other words, the second message includes the RLC bearer configuration information of the first unicast connection and the RLC bearer configuration information of the second unicast connection.

Optionally, the base station of the UE 1 may further determine QoS information associated with the RLC bearer configuration information of the second unicast connection, and send the QoS information to the UE 1.

Manner 2: The UE 1 reports end-to-end QoS information corresponding to UE 2, a base station of the UE 1 sends only the RLC bearer configuration information of the first unicast connection to the UE 1, and the UE 1 determines the RLC bearer configuration information of the second unicast connection based on the RLC bearer configuration information of the first unicast connection and the end-to-end QoS information between the UE 1 and the UE 2.

Optionally, the UE 1 may further determine, based on the RLC bearer configuration information of the first unicast connection and/or the end-to-end QoS information corresponding to the RLC bearer configuration information, QoS information associated with the RLC bearer configuration information of the second unicast connection.

2. The UE 1 is in a Non-RRC Connected State, for Example, the UE 1 is in an RRC Idle State, an RRC Inactive State, or an OOC State.

The UE 1 determines the RLC bearer configuration information of the second unicast connection based on the RLC bearer configuration information of the first unicast connection obtained from a SIB system broadcast message and/or preconfigured information (namely, an example of a third message) and end-to-end QoS information corresponding to the RLC bearer configuration information.

Optionally, the UE 1 may further determine, based on the RLC bearer configuration information of the first unicast connection and/or the end-to-end QoS information corresponding to the RLC bearer configuration information, QoS information associated with the RLC bearer configuration information of the second unicast connection.

The RLC bearer configuration information includes RLC configuration information and logical channel (LCH) configuration information, and may be divided into three parts: a parameter related only to sending, a parameter related to both sending and receiving, and a parameter related only to receiving.

1. The Parameter Related Only to Sending (Including One or More of the Following Parameters):

the RLC configuration information, which includes: a timer length T-PollRetransmit for controlling polling retransmission, parameters pollPDU and pollByte for controlling triggering polling, and a maximum allowed quantity of automatic repeat request (automatic repeat request, ARQ) retransmissions in an RLC AM mode; and the LCH configuration information, which includes: a priority of an LCH, a parameter (for example, a logical channel priority, a prioritized bit rate (PBR), token bucket size duration (BSD), and an indication indicating whether to allow use of a configured grant type1) related to controlling execution of a logical channel priority (LCP), whether to enable a hybrid automatic repeat request (HARQ) feedback, a scheduling request (SR) resource associated with the LCH, a logical channel group (LCG) to which the LCH belongs, and the like.

2. The Parameter Related to Both Sending and Receiving (Including One or More of the Following Parameters):

the RLC configuration information, which includes an RLC mode and an RLC serial number (SN) length; and the LCH configuration information, which includes a logical channel ID (LCID).

It should be understood that the parameter related only to receiving is usually determined by the receiving UE, and in a current technology and this application, UE does not need to exchange these parameters.

It may be understood that the RLC bearer configuration information of the first unicast connection refers to a configuration parameter that is related to both sending and receiving and that is in the RLC bearer, that is, includes the configuration parameter in 1 in the RLC bearer configuration information. The RLC bearer configuration information of the second unicast connection refers to a configuration parameter related to both sending and receiving and a configuration parameter related only to sending that are in the RLC bearer, that is, includes the configuration parameters in 1 and 2 in the RLC bearer configuration information.

Optionally, the configuration parameter that is related to both sending and receiving and that is in the RLC bearer configuration information of the first unicast connection is the same as the configuration parameter that is related to both sending and receiving and that is in the RLC bearer configuration information of the second unicast connection.

Optionally, when the configuration parameters related to both sending and receiving in the RLC bearer configuration information of the first unicast connection and the second unicast connection are the same, the base station of the UE 1 may send only one copy of the configuration parameter related to both sending and receiving to the UE 1. Similarly, the UE 1 may also send only one copy of the configuration parameter to relay UE in S302 below.

S302: The UE 1 sends the first message to the relay UE (namely, an example of the third terminal device).

Optionally, the UE 1 may send the first message by using an RRCReconfigurationSidelink message.

Optionally, the UE 1 further sends, to the relay UE, the QoS information corresponding to the RLC bearer configuration information of the second unicast connection.

S303: The relay UE sends a fourth message to the UE 2.

The fourth message includes third information, and the third information is all or a part of the second information.

Optionally, because the UE 2 needs to receive only the parameter that is related to both sending and receiving and that is in the RLC bearer configuration information of the second unicast connection, the relay UE may send, to the UE 2, the parameter that is related to both sending and receiving and that is in the RLC bearer configuration information of the second unicast connection, and does not need to send the parameter that is related only to sending and that is in the RLC bearer configuration information of the second unicast connection.

For example, the relay UE may send the fourth message by using the RRCReconfigurationSidelink message.

Optionally, the relay UE further sends, to the UE 2, the QoS information corresponding to the RLC bearer configuration information of the second unicast connection.

It may be understood that, for the relay UE, after receiving the first message sent by the UE 1, the relay UE triggers sending the RLC bearer configuration information of the second unicast connection to the UE 2.

S304: The UE 2 sends a second response message to the relay UE.

It should be understood that the second response message is a response of the UE 2 to an application status of the RLC bearer configuration information of the second unicast connection included in the fourth message.

Optionally, the second response message indicates that the UE 2 successfully complies with the RLC bearer configuration information of the second unicast connection. For example, the second response message may be an RRCReconfigurationCompleteSidelink message.

It should be understood that in this application, that the UE successfully applies the RLC bearer configuration information may also be represented as that the UE successfully complies with the RLC bearer configuration information, and that the UE cannot apply the RLC bearer configuration information may be represented as that the UE cannot comply with the RLC bearer configuration information. The two descriptions are interchangeable. This is not specifically limited in this application.

Optionally, the second response message indicates that the RLC bearer configuration information of the second unicast connection fails to be configured, that is, the UE 2 cannot comply with the parameter that is related to both sending and receiving and that is in the RLC bearer configuration information of the second unicast connection, that is, cannot comply with the corresponding configuration. For example, the second response message may be an RRCReconfigurationFailureSidelink message.

S305: The relay UE sends a first response message to the UE 1.

It should be understood that the first response message is a response to an application status of the RLC bearer configuration information of the first unicast connection and the RLC bearer configuration information of the second unicast connection.

Optionally, the first response message indicates that the RLC bearer configuration information of the first unicast connection and the RLC bearer configuration information of the second unicast connection are both successfully configured. For example, the first response message may be an RRCReconfigurationCompleteSidelink message.

Optionally, the first response message may alternatively be an RRCReconfigurationFailureSidelink message, and indicates that configuration of all or a part of the RLC bearer configuration information of the first unicast connection and the RLC bearer configuration information of the second unicast connection fails. For example, the first response message may be the RRCReconfigurationFailureSidelink message.

It should be understood that, in this embodiment, when the second response message is the RRCReconfigurationFailureSidelink message, the first response message is definitely the RRCReconfigurationFailureSidelink message. It may also be understood that the first response message may be the RRCReconfigurationCompleteSidelink message only when the second response message is the RRCReconfigurationCompleteSidelink message.

Optionally, when the first response message is the RRCReconfigurationFailureSidelink message, the first response message may further specifically indicate a failure cause. For example, the first response message further includes indication information. The indication information may indicate that the relay UE cannot complete configuration of the configuration parameter that is related to both sending and receiving and that is in the RLC bearer configuration information of the first unicast connection (that is, the relay UE, as Rx UE, fails in configuration), and/or indicate that the relay UE cannot complete configuration of the configuration parameter that is related only to sending and that is in the RLC bearer configuration information of the second unicast connection (that is, the relay UE, as Tx UE, fails in configuration), and/or indicate that the relay UE cannot complete configuration of the configuration parameter that is related to both sending and receiving and that is in the RLC bearer configuration information of the second unicast connection (that is, the relay UE, as Tx UE, fails in configuration), and/or indicate that the UE 2 cannot complete configuration of the configuration parameter that is related to both sending and receiving and that is in the RLC bearer configuration information of the second unicast connection (that is, the UE 2, as Rx UE, fails in configuration).

Optionally, when the relay UE is in an RRC connected state, S306 is performed. To be specific, the relay UE reports, to a base station of the relay UE, all or a part of the RLC bearer configuration information of the second unicast connection and the QoS information corresponding to the RLC bearer configuration information of the second unicast connection.

It should be noted that S306 may be performed after the second response message in S304 indicates success, and there is no time sequence relationship between S306 and S305.

Optionally, the relay UE may report an LCID of the RLC bearer configuration information of the second unicast connection (or an index of the RLC bearer configuration information of the second unicast connection) and QoS information corresponding to the LCID, that is, report an identifier/index and QoS information corresponding to the identifier/index.

Optionally, the base station of the relay UE responds to the information sent in S306. The base station of the relay UE may configure, for the relay UE by obtaining all or a part of configuration information of the RLC bearer configuration information of the second unicast connection and the QoS information corresponding to the RLC bearer configuration information of the second unicast connection, an SR resource associated with the LCH and/or a correspondence between the LCH and the LCG. Specifically, the base station of the relay UE configures, for the relay UE, the LCID (or the index of the RLC bearer configuration information) and SR resource information and/or LCG information corresponding to the LCID, that is, configures an identifier/index and SR resource information and/or LCG information corresponding to the identifier/index. In other words, the base station of the relay UE may allocate a sidelink transmission resource to the relay UE by obtaining the RLC bearer configuration information of the second unicast connection, to ensure communication quality of sidelink communication. It may be understood that the SR resource information may be an SR identifier, and the LCG information may be an LCG identifier.

Optionally, in S307, the UE 1 sends PDCP entity configuration information and/or SDAP entity configuration information to the UE 2.

It should be noted that the execution of S307 is independent, and there is no time sequence for execution. For example, S307 may be executed before S302.

Optionally, in S308, the UE 2 sends a third response message to the UE 1.

It should be understood that the third response message is a response message of the UE 2 for S307. For example, the third response message may be an RRCReconfiguration-CompleteSidelink message, or the third response message may be an RRCReconfigurationFailureSidelink message.

In the foregoing technical solution, the UE 1 determines the RLC bearer configuration information of the first unicast connection and the RLC bearer configuration information of the second unicast connection, and the RLC bearer configuration information and response messages indicating that the RLC bearer configuration information is successfully applied or fails to be applied are exchanged between the UE 1 and the relay UE and between the relay UE and the UE 2, to ensure an end-to-end QoS requirement of communication between the UE 1 and the UE 2 through the relay UE, and improve U2U relay communication quality.

The foregoing embodiment is an RLC bearer establishment process. This application describes an RLC bearer release process in detail in the following.

Figure 4:
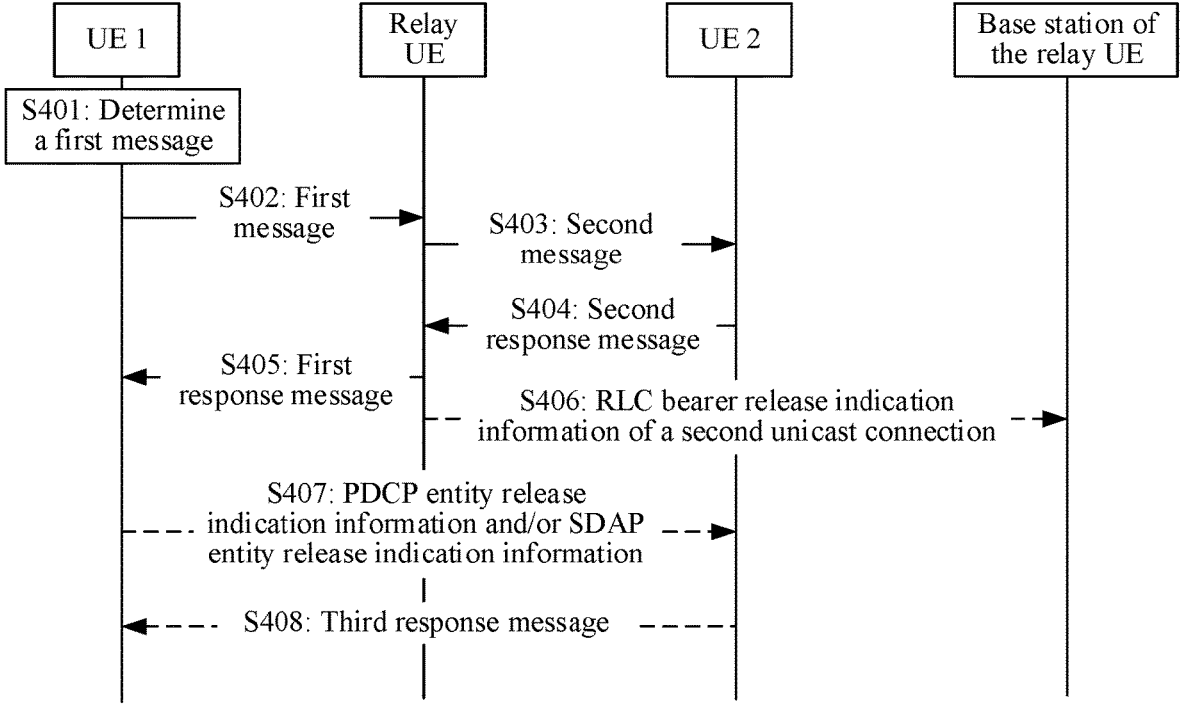
FIG. 4 is a schematic flowchart of a communication releasing method according to this application.

FIG. 4 is a schematic flowchart of a bearer releasing method according to this application.

S401: UE 1 (namely, an example of a first terminal device) determines a first message.

The first message includes first information and/or second information, the first information includes RLC bearer release information of a first sidelink, the second information includes RLC bearer release information of a second sidelink, the first sidelink is a sidelink between the first terminal device and a third terminal device, and the second sidelink is a sidelink between the third terminal device and a second terminal device.

Optionally, the RLC bearer release information may be indicated by using a configuration index or an LCID corresponding to an RLC bearer. This is not specifically limited in this application.

It may be understood that, the sidelink may be a sidelink of a unicast connection, may be a sidelink of a multicast connection, or may be a sidelink of a broadcast connection.

By way of example but not limitation, an example in which the first sidelink and the second sidelink are sidelinks of unicast connections is used below for description. To be specific, an example in which the RLC bearer release information of the first sidelink is RLC bearer release information of a first unicast connection, and the RLC bearer release information of the second sidelink is RLC bearer release information of a second unicast connection is used for description. Optionally, the unicast connection may be a PC5-S connection or a PC5-RRC connection.

S402: The UE 1 sends the first message to relay UE (namely, an example of the third terminal device).

Optionally, the UE 1 may send the first message by using an RRCReconfigurationSidelink message.

Optionally, the first message may include a configuration index or an LCID corresponding to an RLC bearer of the first unicast connection and/or an RLC bearer of the second unicast connection.

It should be noted that, when the first message in S401 includes only the first information, the relay UE determines the second message based on the first information, and the second message includes the RLC bearer release information of the second unicast connection. In other words, when the RLC bearer of the first unicast connection needs to be released, to ensure that communication statuses of the two unicast connections are consistent, the RLC bearer corresponding to the second unicast connection also needs to be released.

S403: The relay UE sends a second message to UE 2 (namely, an example of the second terminal device).

Optionally, the second message may include a configuration index or an LCID corresponding to the RLC bearer of the second unicast connection.

Optionally, the relay UE may send the second message by using the RRCReconfigurationSidelink message.

S404: The UE 2 sends a second response message to the relay UE.

It should be understood that, the second response message is a response of the UE 2 to the RLC bearer release information of the second unicast connection in the second message.

Optionally, the second response message indicates that the UE 2 successfully releases the RLC bearer of the second unicast connection. For example, the second response message may be an RRCReconfigurationCompleteSidelink message.

Optionally, the second response message indicates that the UE 2 fails to configure the RLC bearer configuration information of the second unicast connection, that is, the UE 2, as Rx UE, cannot release the RLC bearer of the second unicast connection. For example, the second response message may be an RRCReconfigurationFailureSidelink message.

S405: The relay UE sends a first response message to the UE 1.

It should be understood that, the first response message is a response of the relay UE to the RLC bearer release information of the first unicast connection and the RLC bearer release information of the second unicast connection.

Optionally, the first response message indicates that the RLC bearer of the first unicast connection and the RLC bearer of the second unicast connection are successfully released. For example, the first response message may be an RRCReconfigurationCompleteSidelink message.

Optionally, the first response message indicates that all or a part of the RLC bearer of the first unicast connection and the RLC bearer of the second unicast connection fail to be released. For example, the first response message may be an RRCReconfigurationFailureSidelink message.

It should be understood that, in this embodiment, when the second response message is the RRCReconfiguration-FailureSidelink message, the first response message is definitely the RRCReconfigurationFailureSidelink message. It may also be understood that the first response message may be the RRCReconfigurationCompleteSidelink message only when the second response message is the RRCReconfigurationCompleteSidelink message.

Optionally, when the first response message is the RRCReconfigurationFailureSidelink message, the first response message may further specifically indicate a release failure cause. For example, the first response message further includes indication information. The indication information may indicate that the relay UE fails to release the RLC bearer of the first unicast connection (that is, the relay UE, as Rx UE, fails to release the RLC bearer of the first unicast connection), and/or indicate that the relay UE fails to release the RLC bearer of the second unicast connection (that is, the relay UE, as Tx UE, fails to release the RLC bearer of the second unicast connection), and/or indicate that the UE 2 fails to release the RLC bearer of the second unicast connection (that is, the UE 2, as Rx UE, fails to release the RLC bearer of the second unicast connection).

Optionally, when the relay UE is in an RRC connected state, S406 is performed. To be specific, the relay UE reports to a base station of the relay UE, RLC bearer release indication information of the second unicast connection.

It should be noted that S406 may be performed only after S404, and there is no time sequence relationship between S406 and S405.

Optionally, the relay UE may report, to the base station of the relay UE, an LCID of the released RLC bearer of the second unicast connection or an index of the released RLC bearer configuration information of the second unicast connection, that is, report an identifier or an index.

Optionally, the base station of the relay UE updates, for the relay UE, an SR resource associated with the LCH and/or a correspondence between the LCH and the LCG. Specifically, the base station of the relay UE updates, for the relay UE, the LCID (or the index of the RLC bearer configuration information) and SR resource information and/or LCG information corresponding to the LCID, that is, updates an identifier/index and SR resource information and/or LCG information corresponding to the identifier/index.

Optionally, S407 is performed. To be specific, the UE 1 sends PDCP entity release information and/or SDAP entity release information to the UE 2.

It should be noted that, there is no time sequence for execution of S407. For example, S407 may be executed before S401.

Optionally, S408 is performed. To be specific, the UE 2 sends a third response message to the UE 1.

It should be understood that, the message is a response message for S407. For example, the third response message may be an RRCReconfigurationCompleteSidelink message, or the third response message may be an RRCReconfigurationFailureSidelink message.

Figure 5:
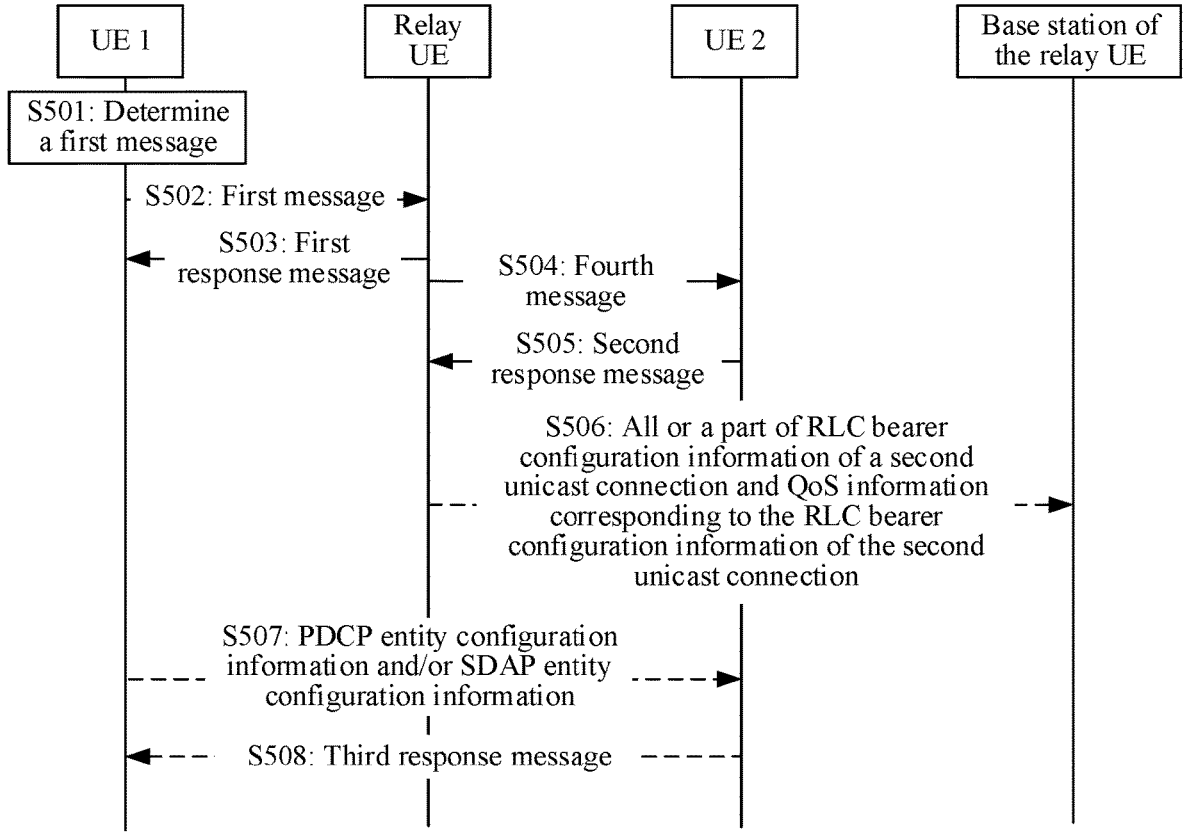
FIG. 5 is a schematic flowchart of another communication configuration method according to this application.

With reference to FIG. 5, this application provides another communication configuration method. A basic logic thereof is similar to that of the embodiment corresponding to FIG. 3. A difference lies in that exchange of RLC bearer configuration information of a first unicast connection is completed before exchange of RLC bearer configuration information of a second unicast connection. In other words, relay UE may send a response message to UE 1 without waiting for receiving a response message from UE 2. The following describes the method in detail.

FIG. 5 is a schematic flowchart of another communication configuration method according to this application.

S501: The UE 1 determines a first message.

S502: The UE 1 sends the first message to the relay UE.

For S501 and S502, refer to specific descriptions of S301 and S302 in FIG. 3. Details are not described herein again.

S503: The relay UE sends a first response message to the UE 1.

It should be understood that, the first response message is a response of the relay UE to an application status of RLC bearer configuration information related to the relay UE in the first message.

Optionally, the first response message indicates that a parameter of the RLC bearer configuration information related to the relay UE in the first message is successfully configured. For example, the second response message may be an RRCReconfigurationCompleteSidelink message.

It should be noted that, the relay UE sends the RRCReconfigurationCompleteSidelink message to the UE 1 only when the relay UE can complete configuration of a parameter that is related only to sending and that is in the RLC bearer configuration information of the second unicast connection, when the relay UE can complete configuration of a parameter that is related to both sending and receiving and that is in the RLC bearer configuration information of the second unicast connection, and when the relay UE can complete configuration of a parameter that is related only to both sending and receiving and that is in the RLC bearer configuration information of the first unicast connection.

Optionally, the first response message indicates that all or some parameters of the RLC bearer configuration information related to the relay UE in the first message fail to be configured. For example, the second response message may be an RRCReconfigurationFailureSidelink message.

Optionally, when the first response message is the RRCReconfigurationFailureSidelink message, the response message may further specifically indicate a failure cause. For example, the response message further includes indication information. The indication information may indicate that the relay UE cannot complete configuration of the RLC bearer configuration information of the first unicast connection (that is, the relay UE, as Rx UE, fails in configuration), and/or indicate that the relay UE cannot complete configuration of a parameter that is related only to sending and that is in the RLC bearer configuration information of the second unicast connection (that is, the relay UE, as Tx UE, fails in configuration), and/or indicate that the relay UE cannot complete configuration of a parameter that is related only to sending and that is in the RLC bearer configuration information of the second unicast connection (that is, the relay UE, as Tx UE, fails in configuration).

S504: The relay UE sends a fourth message to the UE 2.

The fourth message includes third information, and the third information is all or a part of the second information.

Optionally, because the UE 2 needs to receive only the parameter that is related to both sending and receiving and that is in the RLC bearer configuration information of the second unicast connection, the relay UE may send, to the UE 2, the parameter that is related to both sending and receiving and that is in the RLC bearer configuration information of the second unicast connection, and does not need to send the parameter that is related only to sending and that is in the RLC bearer configuration information of the second unicast connection.

For example, the relay UE may send the fourth message by using the RRCReconfigurationSidelink message.

It should be noted that, the relay UE is triggered to send the RLC bearer configuration information of the second unicast connection to the UE 2 only when the first response message in S503 indicates that a parameter of the RLC bearer configuration information related to the relay UE in the first message is successfully configured.

Optionally, the relay UE further sends, to the UE 2, QoS information corresponding to the RLC bearer configuration information of the second unicast connection.

S505: The UE 2 sends a second response message to the relay UE.

It should be understood that, the second response message is a response of the UE 2 to an application status of the RLC bearer configuration information of the second unicast connection included in the fourth message.

Optionally, the second response message indicates that the UE 2 successfully complies with the RLC bearer configuration information of the second unicast connection. For example, the second response message may be an RRCReconfigurationCompleteSidelink message.

Optionally, the second response message indicates that the RLC bearer configuration information of the second unicast connection fails to be configured, that is, the UE 2, as Rx UE, cannot comply with configuration of the parameter that is related to both sending and receiving and that is in the RLC bearer configuration information of the second unicast connection. For example, the second response message may be an RRCReconfigurationFailureSidelink message.

Optionally, when the second response message is the RRCReconfigurationFailureSidelink message, the relay UE triggers sending failure indication information to the UE 1, where the failure indication information indicates that the RLC bearer configuration information of the second unicast connection fails to be configured. Optionally, after receiving the failure indication information sent by the relay UE, the UE 1 releases the corresponding RLC bearer of the first unicast connection or releases the first unicast connection, to ensure that communication statuses of the two unicast connections are consistent, and reduce additional resource overheads.

Processes of S506 to S508 are the same as processes of S306 to S308 in the embodiment corresponding to FIG. 3. For details, refer to descriptions of corresponding steps in FIG. 3. Details are not described herein again.

The foregoing procedure is an RLC bearer establishment process. This application describes an RLC bearer release process in detail in the following.

Figures 6, 7:
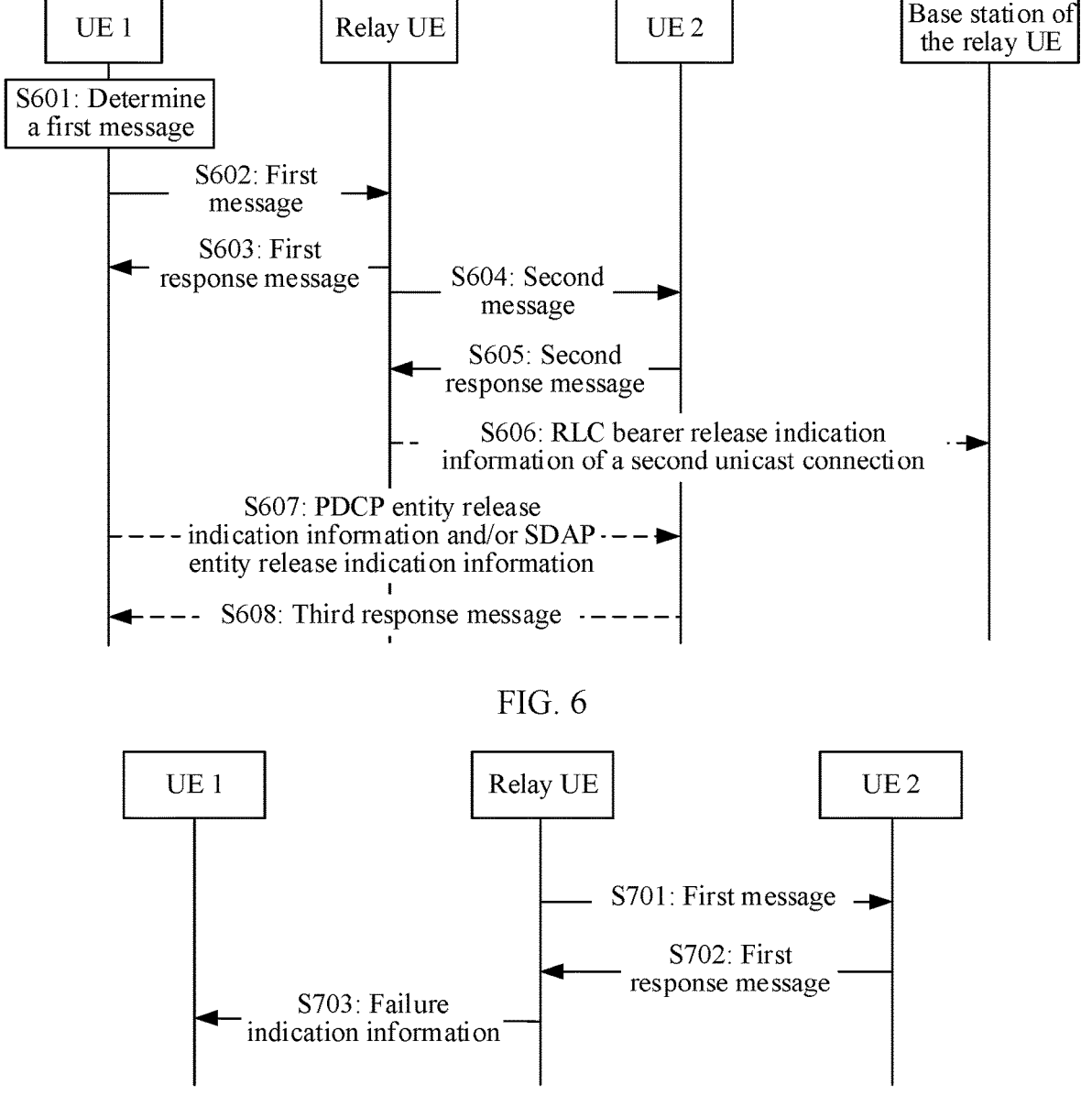
FIG. 6 is a schematic flowchart of another communication releasing method according to this application.
FIG. 7 is a schematic flowchart of another communication configuration method according to this application.

Similarly, with reference to FIG. 6, this application provides another bearer releasing method. A basic logic of the method is similar to that of the embodiment corresponding to FIG. 4. A difference lies in that exchange of RLC bearer releasing of a first unicast connection is completed before exchange of RLC bearer releasing of a second unicast connection. In other words, relay UE may send a response message to UE 1 without waiting for a response message sent by UE 2. The following describes in detail an RLC bearer releasing procedure.

FIG. 6 is a schematic flowchart of another bearer releasing method according to this application.

S601: The UE 1 determines a first message.

S602: The UE 1 sends the first message to the relay UE.

For S601 and S602, refer to specific descriptions of S401 and S402 in FIG. 4. Details are not described herein again.

S603: The relay UE sends a first response message to the UE 1.

It should be understood that, the first response message is a response of the relay UE to the RLC bearer release information of the first unicast connection and the RLC bearer release information of the second unicast connection.

Optionally, the first response message indicates that the relay UE successfully releases the RLC bearer of the first unicast connection and the RLC bearer of the second unicast connection. For example, the second response message may be an RRCReconfigurationFailureSidelink message.

Optionally, the first response message indicates that all or a part of the RLC bearer of the first unicast connection and the RLC bearer of the second unicast connection fail to be released. For example, the second response message may be an RRCReconfigurationFailureSidelink message.

S604: The relay UE sends a second message to the UE 2.

It should be noted that, when the first message in S401 includes only the first information, the relay UE determines the second message based on the first information, and the second message includes the RLC bearer release information of the second unicast connection. In other words, when the RLC bearer of the first unicast connection needs to be released, to ensure that communication statuses of the two unicast connections are consistent, the RLC bearer of the second unicast connection also needs to be released.

Optionally, the second message may include a configuration index or an LCID corresponding to the RLC bearer of the second unicast connection.

Optionally, the relay UE may send the second message by using the RRCReconfigurationSidelink message.

It should be noted that, the relay UE is triggered to send the RLC bearer release information of the second unicast connection to the UE 2 only when the first response message in S603 indicates that the relay UE successfully releases the RLC bearer of the first unicast connection and the RLC bearer of the second unicast connection.

S605: The UE 2 sends a second response message to the relay UE.

It should be understood that, the second response message is a response of the UE 2 to the RLC bearer release information of the second unicast connection.

Optionally, the second response message indicates that the RLC bearer of the second unicast connection is successfully released. For example, the second response message may be an RRCReconfigurationCompleteSidelink message.

Optionally, the second response message indicates that the RLC bearer of the second unicast connection fails to be released. For example, the second response message may be an RRCReconfigurationFailureSidelink message.

Optionally, when the second response message is the RRCReconfigurationFailureSidelink message, the relay UE triggers sending failure indication information to the UE 1, where the failure indication information indicates that the RLC bearer of the second unicast connection fails to be released. Optionally, after receiving the failure indication information sent by the relay UE, the UE 1 restores the corresponding RLC bearer of the first unicast connection or reestablishes the first unicast connection, to ensure that communication statuses of the two unicast connections are consistent, and reduce additional resource overheads.

When the relay UE is in an RRC connected state, optionally, S606 is performed. Processes of S606 to S608 are the same as processes of S406 to S408 in the embodiment corresponding to FIG. 4. For details, refer to descriptions of corresponding steps in FIG. 4. Details are not described herein again.

FIG. 7 is a schematic flowchart of another communication configuration method according to this application. A logic of this embodiment may be different from that of the foregoing embodiments. RLC bearer configuration information of a second unicast connection may be obtained by relay UE from a network. The following describes the specific steps of the method in detail.

S701: The relay UE sends a first message to UE 2.

Optionally, when an RLC bearer of the second unicast connection needs to be established, the first message may include the RLC bearer configuration information of the second unicast connection.

Optionally, when an RLC bearer of the second unicast connection needs to be released, the first message may include RLC bearer release information of the second unicast connection.

For example, the relay UE may send the first message by using an RRCReconfigurationSidelink message. Specifically, refer to the content of the foregoing embodiments.

S702: The UE 2 sends a first response message to the relay UE.

In this embodiment, an example in which the first response message is the RRCReconfigurationFailureSidelink message is used for description. In other words, the UE 2 cannot comply with the RLC bearer configuration information of the second unicast connection or the RLC bearer release information of the second unicast connection sent by the relay UE.

S703: The relay UE sends failure indication information to UE 1.

When receiving the RRCReconfigurationFailureSidelink message sent by the UE 2, the relay UE is triggered to send the failure indication information to the UE 1. The indication information indicates that the UE 2 cannot comply with the RLC bearer configuration information of the second unicast connection or the RLC bearer release information of the second unicast connection in the first message. For example, the failure indication information may include QoS information corresponding to the RLC bearer of the second unicast connection, or a configuration index or an LCID corresponding to the RLC bearer of the second unicast connection, or a configuration index or an LCID corresponding to an RLC bearer of the first unicast connection associated with the RLC bearer of the second unicast connection.

Optionally, in S704, after receiving the failure indication information, the UE 1 releases the corresponding RLC bearer of the first unicast connection or releases the first unicast connection (when the relay UE sends the RLC bearer configuration information of the second unicast connection in S701), or restores the RLC bearer of the first unicast connection or reestablishes the first unicast connection (when the relay UE sends the RLC bearer release information of the second unicast connection in S701).

In the foregoing technical solution, when the UE 2 responds to the relay UE that the UE 2 cannot comply with the RLC bearer configuration information of the second unicast connection or the RLC bearer release information of the second unicast connection sent by the relay UE, the relay UE sends the failure indication information to the UE 1, so that the UE 1 can learn of the failure indication information, and the UE 1 can further take a corresponding action to ensure consistency of communication statuses of the two unicast connections, to reduce additional resource overheads.

The foregoing describes in detail the communication configuration method provided in this application. The following describes a communication apparatus provided in this application.

Figure 8:
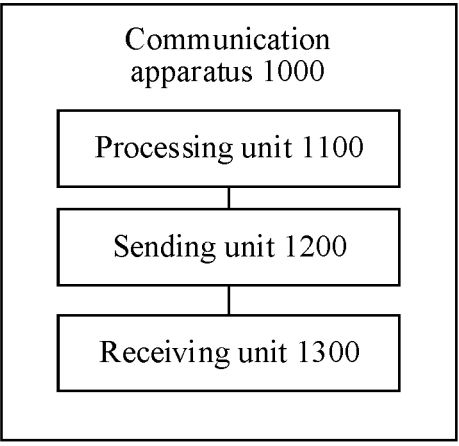
FIG. 8 is a schematic block diagram of a communication apparatus 1000 according to this application.

FIG. 8 is a schematic block diagram of a communication apparatus 1000 according to this application. As shown in FIG. 8, the communication apparatus 1000 includes a processing unit 1100 and a sending unit 1200.

The processing unit 1100 is configured to determine a first message, where the first message includes first information and second information, the first information includes radio link control RLC bearer configuration information of a first sidelink, the second information includes RLC bearer configuration information of a second sidelink, the first sidelink is a sidelink between the first terminal device configured with the communication apparatus and a third terminal device, and the second sidelink is a sidelink between the third terminal device and a second terminal device. The sending unit 1200 is configured to send the first message to the third terminal device.

Optionally, in an embodiment, the first terminal device and the second terminal device communicate with each other through the third terminal device.

Optionally, in another embodiment, the first message further includes first quality of service QoS information, and the first QoS information is QoS information corresponding to the second information.

Optionally, the communication apparatus 1000 may further include a receiving unit 1300, configured to perform a receiving action performed by the first terminal device.

Optionally, in another embodiment, the receiving unit 1300 is configured to receive a second message sent by a first network device, where the second message includes first information and second information, or the second message includes the first information. The first terminal device determines the first message based on the second message.

Optionally, in another embodiment, before the receiving unit 1300 receives the second message sent by the first network device, the sending unit 1200 is further configured to send second QoS information to the first network device, where the second QoS information is QoS information between the first terminal device and the second terminal device, and the second message is determined by the first network device based on the second QoS information.

Optionally, in another embodiment, the processing unit 1100 is configured to obtain the first information from a third message, where the third message includes a system information block SIB system broadcast message and/or preconfigured information. The processing unit 1100 is further configured to determine the second information based on the first information.

Optionally, in another embodiment, the receiving unit 1300 is further configured to receive a first response message sent by the third terminal device, where the first response message indicates that a part or all of the first information and the second information is successfully configured or fails to be configured.

Optionally, in another embodiment, that a part of the first information and the second information is successfully configured includes: RLC bearer configuration information that is of a sidelink related to the third terminal device and that is in the first information and the second information is successfully configured.

Optionally, in another embodiment, when the first response message indicates that the first information and the second information fail to be configured, the first response message further specifically indicates that a part or all of RLC bearer configuration information that is of a sidelink related to the second terminal device and/or the third terminal device and that is in the first information and the second information fails to be configured.

In some other solutions, units of the communication apparatus 1000 are further configured to perform the following steps and/or operations.

The processing unit 1100 is configured to determine a first message, where the first message includes first information and/or second information, the first information includes radio link control RLC bearer release information of a first sidelink, the second information includes RLC bearer release information of a second sidelink, the first sidelink is a sidelink between the first terminal device configured with the communication apparatus and a third terminal device, and the second sidelink is a sidelink between the third terminal device and a second terminal device. The sending unit 1200 is configured to send the first message to the third terminal device.

Optionally, in an embodiment, the first terminal device and the second terminal device communicate with each other through the third terminal device.

Optionally, in another embodiment, the receiving unit 1300 is configured to receive a first response message sent by the third terminal device, where the first response message indicates that a part or all of an RLC bearer of the first sidelink and a radio link control RLC bearer of the second sidelink are successfully released or fail to be released.

Optionally, in another embodiment, that a part of the RLC bearer of the first sidelink and the RLC bearer of the second sidelink are successfully released includes: an RLC bearer that is of a sidelink related to the third terminal device and that is in the RLC bearer of the first sidelink and the RLC bearer of the second sidelink is successfully released.

Optionally, in another embodiment, when the first response message indicates that the RLC bearer of the first sidelink and the RLC bearer of the second sidelink fail to be released, the first response message further specifically indicates that a part or all of RLC bearers that are of a sidelink related to the second terminal device and/or the third terminal device and that are in the first information and the second information fail to be released.

Optionally, the sending unit 1200 and the receiving unit 1300 may alternatively be integrated into one transceiver unit, and have both receiving and sending functions. This is not limited herein.

In an implementation, the communication apparatus 1000 may be the first terminal device in the method embodiments. In this implementation, the sending unit 1200 may be a transmitter, and the receiving unit 1300 may be a receiver. The receiver and the transmitter may alternatively be integrated into one transceiver. The processing unit 1100 may be a processing apparatus.

In another implementation, the communication apparatus 1000 may be a chip or an integrated circuit installed in the first terminal device. In this implementation, the sending unit 1200 and the receiving unit 1300 may be a communication interface or an interface circuit. For example, the sending unit 1200 is an output interface or an output circuit, the receiving unit 1300 is an input interface or an input circuit, and the processing unit 1100 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, to enable the communication apparatus 1000 to perform the operation and/or processing performed by the first terminal device in the method embodiments. Optionally, the processing apparatus may include only the processor, and the memory configured to store the computer program is located outside the processing apparatus. The processor is connected to the memory through a circuit/cable, to read and execute the computer program stored in the memory. For another example, the processing apparatus may be a chip or an integrated circuit.

Figure 9:
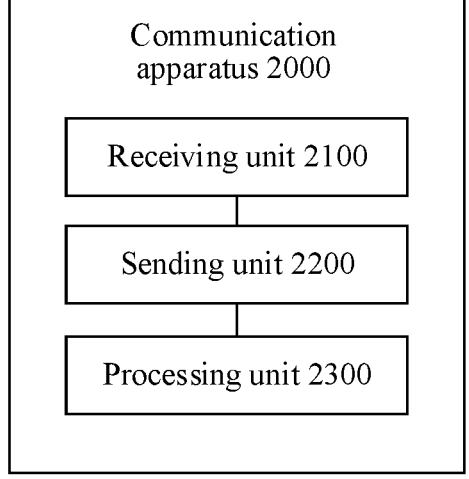
FIG. 9 is a schematic block diagram of a communication apparatus 2000 according to this application.

FIG. 9 is a schematic block diagram of a communication apparatus 2000 according to this application. As shown in FIG. 9, the communication apparatus 2000 includes a receiving unit 2100 and a sending unit 2200.

The receiving unit 2100 is configured to receive a first message sent by a first terminal device, where the first message includes first information and second information, the first information includes radio link control RLC bearer configuration information of a first sidelink, the second information includes RLC bearer configuration information of a second sidelink, the first sidelink is a sidelink between the first terminal device and a third terminal device configured with the communication apparatus, and the second sidelink is a sidelink between the third terminal device and a second terminal device. The sending unit 2200 is configured to send a fourth message to the second terminal device, where the fourth message includes third information, and the third information is all or a part of the second information.

Optionally, in an embodiment, the first terminal device and the second terminal device communicate with each other through the third terminal device.

Optionally, in another embodiment, the receiving unit 2100 is further configured to receive first quality of service QoS information sent by the first terminal device, where first QoS information is QoS information corresponding to the second information. The sending unit 2200 is further configured to send the first QoS information to the second terminal device.

Optionally, in another embodiment, the sending unit 2200 is further configured to send a first response message to the first terminal device, where the first response message indicates that a part or all of the first information and the second information is successfully configured or fails to be configured.

Optionally, in another embodiment, that a part of the first information and the second information is successfully configured includes: RLC bearer configuration information that is of a sidelink related to the third terminal device and that is in the first information and the second information is successfully configured.

Optionally, in another embodiment, when the first response message indicates that the first information and the second information fail to be configured, the first response message further specifically indicates that a part or all of RLC bearer configuration information that is of a sidelink related to the second terminal device and/or the third terminal device and that is in the first information and the second information fails to be configured.

Optionally, in another embodiment, the receiving unit 2100 is further configured to receive a second response message sent by the second terminal device, where the second response message indicates that the third information is successfully configured or fails to be configured.

Optionally, the communication apparatus 2000 may further include a processing unit 2300, configured to perform processing or an operation performed internally by the third terminal device.

In some other solutions, units of the communication apparatus 1000 are further configured to perform the following steps and/or operations.

The receiving unit 2100 is configured to receive a first message sent by a first terminal device, where the first message includes first information and/or second information, the first information includes radio link control RLC bearer release information of a first sidelink, the second information includes RLC bearer release information of a second sidelink, the first sidelink is a sidelink between the first terminal device and a third terminal device configured with the communication apparatus, and the second sidelink is a sidelink between the third terminal device and a second terminal device. The processing unit 2300 is configured to determine a second message based on the first message, where the second message includes the second information. The sending unit 2200 is configured to send the second message to the second terminal device.

Optionally, in an embodiment, the first terminal device and the second terminal device communicate with each other through the third terminal device.

Optionally, in another embodiment, the sending unit 2200 is further configured to send a first response message to the first terminal device, where the first response message indicates that a part or all of an RLC bearer of the first sidelink and an RLC bearer of the second sidelink are successfully released or fail to be released.

Optionally, in another embodiment, that a part of the RLC bearer of the first sidelink and the RLC bearer of the second sidelink are successfully released includes: an RLC bearer that is of a sidelink related to the third terminal device and that is in the RLC bearer of the first sidelink and the RLC bearer of the second sidelink is successfully released.

Optionally, in another embodiment, when the first response message indicates that the RLC bearer of the first sidelink and the RLC bearer of the second sidelink fail to be released, the first response message further specifically indicates that a part or all of RLC bearers that are of a sidelink related to the second terminal device and/or the third terminal device and that are in the first information and the second information fail to be released.

Optionally, in another embodiment, the receiving unit 2100 is further configured to receive a second response message sent by the second terminal device, where the second response message indicates that the RLC bearer of the second sidelink is successfully released or fails to be released.

Optionally, the receiving unit 2100 and the sending unit 2200 may alternatively be integrated into one transceiver unit, and have both receiving and sending functions. This is not limited herein.

In an implementation, the communication apparatus 2000 may be the third terminal device in the method embodiments. In this implementation, the sending unit 2200 may be a transmitter, and the receiving unit 2100 may be a receiver.

The receiver and the transmitter may alternatively be integrated into one transceiver. The processing unit 2300 may be a processing apparatus.

In another implementation, the communication apparatus 2000 may be a chip or an integrated circuit installed in the third terminal device. In this implementation, the receiving unit 2100 and the sending unit 2200 may be a communication interface or an interface circuit. For example, the sending unit 2200 is an output interface or an output circuit, the receiving unit 2100 is an input interface or an input circuit, and the processing unit 2300 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, to enable the communication apparatus 2000 to perform the operation and/or processing performed by the third terminal device in the method embodiments. Optionally, the processing apparatus may include only the processor, and the memory configured to store the computer program is located outside the processing apparatus. The processor is connected to the memory through a circuit/cable, to read and execute the computer program stored in the memory. For another example, the processing apparatus may be a chip or an integrated circuit.

Figure 10:
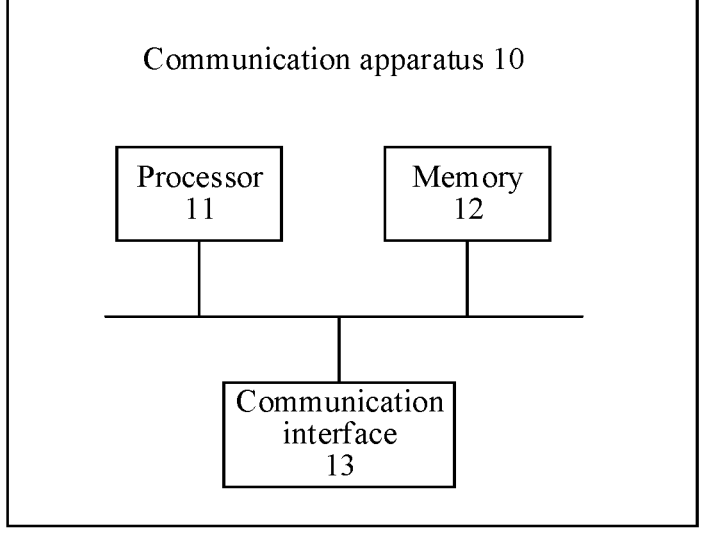
FIG. 10 is a schematic diagram of a structure of a communication apparatus 10 according to this application.

FIG. 10 is a schematic diagram of a structure of a communication apparatus 10 according to this application. As shown in FIG. 10, the communication apparatus 10 includes one or more processors 11, one or more memories 12, and one or more communication interfaces 13. The processor 11 is configured to control the communication interface 13 to send or receive a signal. The memory 12 is configured to store a computer program. The processor 11 is configured to invoke the computer program from the memory 12 and run the computer program, to perform a procedure and/or an operation performed by the first terminal device in the method embodiments of this application.

For example, the processor 11 may have a function of the processing unit 1100 shown in FIG. 8, and the communication interface 13 may have a function of the sending unit 1200 and/or the receiving unit 1300 shown in FIG. 8. Specifically, the processor 11 may be configured to perform processing or an operation performed internally by the first terminal device in the method embodiments of this application, and the communication interface 13 is configured to perform sending and/or receiving actions performed by the first terminal device in the method embodiments of this application.

In an implementation, the communication apparatus 10 may be the first terminal device in the method embodiments. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the first terminal device. In this implementation, the communication interface 13 may be an interface circuit or an input/output interface.

Figure 11:
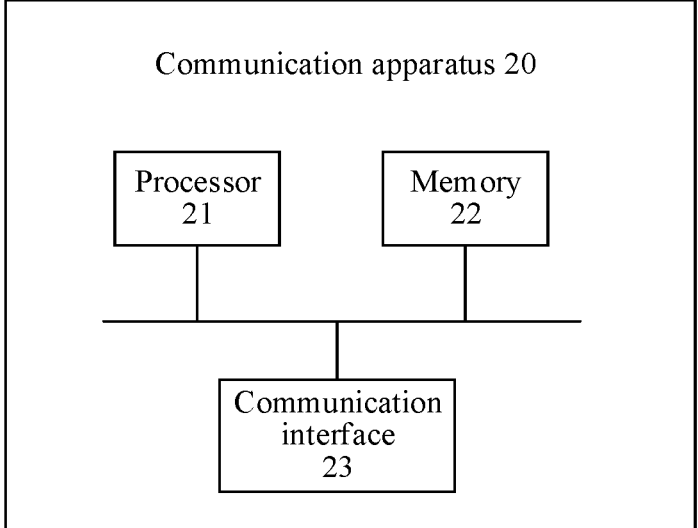
FIG. 11 is a schematic diagram of a structure of a communication apparatus 20 according to this application.

FIG. 11 is a schematic diagram of a structure of a communication apparatus 20 according to this application. As shown in FIG. 11, the communication apparatus 20 includes one or more processors 21, one or more memories 22, and one or more communication interfaces 23. The processor 21 is configured to control the communication interface 23 to send or receive a signal. The memory 22 is configured to store a computer program. The processor 21 is configured to invoke the computer program from the memory 22 and run the computer program, to perform a procedure and/or an operation performed by the third terminal device in the method embodiments of this application.

For example, the processor 21 may have a function of the processing unit 2300 shown in FIG. 9, and the communication interface 23 may have a function of the sending unit 2200 and/or the receiving unit 2100 shown in FIG. 9. Specifically, the processor 21 may be configured to perform processing or an operation performed internally by the third terminal device in the method embodiments of this application, and the communication interface 23 is configured to perform sending and/or receiving actions performed by the third terminal device in the method embodiments of this application. Details are not described again.

In an implementation, the communication apparatus 20 may be the third terminal device in the method embodiments. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 20 may be a chip installed in the third terminal device. In this implementation, the communication interface 13 may be an interface circuit or an input/output interface.

Optionally, the processor and the memory in the apparatus embodiments may be physically independent units, or the memory and the processor may be integrated together. This is not limited in this specification.

In addition, this application further provides a computer-readable storage medium. The computer-readable storage medium stores computer instructions. When the computer instructions are run on a computer, an operation and/or a procedure performed by the first terminal device in the method embodiments of this application is performed.

This application further provides a computer-readable storage medium. The computer-readable storage medium stores computer instructions. When the computer instructions are run on a computer, an operation and/or a procedure performed by the third terminal device in the method embodiments of this application is performed.

This application further provides a computer program product. The computer program product includes computer program code or instructions. When the computer program code or instructions are run on a computer, an operation and/or a procedure performed by the first terminal device in the method embodiments of this application is performed.

This application further provides a computer program product. The computer program product includes computer program code or instructions. When the computer program code or instructions are run on a computer, an operation and/or a procedure performed by the third terminal device in the method embodiments of this application is performed.

In addition, this application further provides a chip, and the chip includes a processor. A memory configured to store a computer program is disposed independent of the chip. The processor is configured to execute the computer program stored in the memory, so that an operation and/or processing performed by the first terminal device in any method embodiment is performed.

Further, the chip may further include a communication interface. The communication interface may be an input/output interface, or may be an interface circuit or the like. Further, the chip may further include the memory.

This application further provides a chip, and the chip includes a processor. A memory configured to store a computer program is disposed independent of the chip. The processor is configured to execute the computer program stored in the memory, so that an operation and/or processing performed by the third terminal device in any method embodiment is performed.

Further, the chip may further include a communication interface. The communication interface may be an input/output interface, or may be an interface circuit or the like. Further, the chip may further include the memory.

In addition, this application further provides a communication system, including the terminal device and the network device in embodiments of this application.

A processor in embodiments of this application may be an integrated circuit chip, and has a signal processing capability. In an implementation process, the steps in the method embodiments may be completed by using a hardware integrated logic circuit or instructions in a form of software in the processor. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the methods in combination with hardware in the processor.

The memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative descriptions, many forms of RAMs are available, for example, a static random access memory (SRAM), a dynamic random access memory (DRAM), a synchronous dynamic random access memory (SDRAM), a double data rate synchronous dynamic random access memory (SDRAM, DDR SDRAM), an enhanced synchronous dynamic random access memory (ESDRAM), a synchlink dynamic random access memory (SLDRAM), and a direct rambus random access memory (DRRAM). It should be noted that the memory in the system and the method described in this specification is intended to include, but not limited to, these memories and any memory of another proper type.

A person of ordinary skill in the art may be aware that, units and algorithm steps in the examples described with reference to embodiments disclosed in this specification can be implemented by electronic hardware or a combination of computer software and electronic hardware. Whether functions are performed in a hardware or software manner depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units are integrated into one unit.

The term "and/or" in this application describes only an association relationship for describing associated objects and indicates that three relationships may exist. For example, A and/or B may indicate the following three cases: Only A exists, both A and B exist, and only B exists. A, B, and C each may be singular or plural. This is not limited.

When the functions are implemented in a form of a software functional unit and sold or used as an independent product, the functions may be stored in a computer-readable storage medium. Based on such an understanding, the technical solutions in this application essentially, the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication configuration method performed by a first terminal device, comprising:
    reporting, to a first network device, end-to-end quality of service (QoS) information between the first terminal device and a second terminal device;
    receiving, from the first network device in response to the reporting, a second message that comprises first information, wherein the first information comprises first radio link control (RLC) bearer configuration information of a first sidelink between the first terminal device and a third terminal device, and the third terminal device is a relay terminal device through which the first terminal device and the second terminal device communicate with each other,
    determining, based on the first RLC bearer configuration information and the end-to-end QoS information, second RLC bearer configuration information of a second sidelink and first QoS information corresponding to the second RLC bearer configuration information, the second sidelink is between the third terminal device and the second terminal device;
    determining a first message, wherein the first message comprises the first information, second information and the first QoS information, wherein the second information comprises the second RLC bearer configuration information of the second sidelink; and
    sending the first message to the third terminal device.

2. The method according to claim 1, further comprising:
    receiving a first response message sent by the third terminal device, wherein the first response message indicates that a part or all of the first information and the second information is successfully configured or fails to be configured.

3. An apparatus, comprising:
    a processor; and
    a non-transitory memory storing a computer program code for execution by the processor, the computer program code comprising instructions for:
    reporting, to a first network device, end-to-end quality of service (QoS) information between the apparatus and a terminal device;
    receiving, from the first network device in response to the reporting, a second message that comprises first information, wherein the first information comprises first radio link control (RLC) bearer configuration information of a first sidelink between the apparatus and a relay terminal device, and the apparatus and the terminal device communicate with each other through the relay terminal device;
    determining, based on the first RLC bearer configuration information and the end-to-end QoS information, second RLC bearer configuration information of a second sidelink and first QoS information corresponding to the second RLC bearer configuration information, wherein the second sidelink is between the relay terminal device and the terminal device;
    determining a first message that comprises the first information, second information and the first QoS information, wherein the second information comprises the second RLC bearer configuration information of the second sidelink; and
    sending the first message to the third terminal device.

4. The apparatus according to claim 3, wherein the computer program code further comprises instructions for:

receiving a first response message sent by the relay terminal device, wherein the first response message indicates that a part or all of the first information and the second information is successfully configured or fails to be configured.

5. A non-transitory computer readable storage medium comprising a computer program code execution by a processor of a first terminal device, the computer program code including instructions for:

reporting, to a first network device, end-to-end quality of service (QoS) information between the first terminal device and a second terminal device;

receiving, from the first network device in response to the reporting, a second message that comprises first information, wherein the first information comprises first radio link control (RLC) bearer configuration information of a first sidelink between the first terminal device and a third terminal device, and the third terminal device is a relay terminal device through which the first terminal device and the second terminal device communicate with each other;

determining, based on the first RLC bearer configuration information and the end-to-end QoS information, second RLC bearer configuration information of a second sidelink and first QoS information corresponding to the second RLC bearer configuration information, and the second sidelink is between the third terminal device and the second terminal device;

determining a first message, wherein the first message comprises the first information, second information, and the first QoS information, wherein the second information comprises the second RLC bearer configuration information of the second sidelink; and sending the first message to the third terminal device.

6. The non-transitory computer readable storage medium according to claim 5, wherein the computer program code further comprises instructions for:

receiving a first response message sent by the third terminal device, wherein the first response message indicates that a part or all of the first information and the second information is successfully configured or fails to be configured.

\* \* \* \* \*